(12) United States Patent
Kulick (10) Patent No.: US 12,229,994 B1
(45) Date of Patent: Feb. 18, 2025

(54) DEPTH SENSOR EVALUATION

(71) Applicant: Amazon Technologies, Inc., Seattle, WA (US)

(72) Inventor: Johannes Kulick, Berlin (DE)

(73) Assignee: Amazon Technologies, Inc., Seattle, WA (US)

( * ) Notice: Subject to any disclaimer, the term of this patent is extended or adjusted under 35 U.S.C. 154(b) by 800 days.

(21) Appl. No.: 17/409,040

(22) Filed: Aug. 23, 2021

(51) Int. Cl.
    *G06T 7/80*     (2017.01)
    *G06T 7/50*     (2017.01)
    *G06T 7/73*     (2017.01)

(52) U.S. Cl.
    CPC ............... *G06T 7/80* (2017.01); *G06T 7/50* (2017.01); *G06T 7/74* (2017.01); *G06T 2207/10028* (2013.01)

(58) Field of Classification Search
    CPC ..................................... G06T 7/74; G06T 7/50
    See application file for complete search history.

(56) References Cited

U.S. PATENT DOCUMENTS

| | | | |
|---|---|---|---|
| 2015/0302570 A1* | 10/2015 | Shirakyan | G06T 7/50 348/46 |
| 2017/0219338 A1* | 8/2017 | Brown | G01B 11/002 |
| 2019/0120770 A1* | 4/2019 | Chen | G01B 11/303 |
| 2020/0090355 A1* | 3/2020 | Hall | G01S 17/32 |

\* cited by examiner

*Primary Examiner* — Myron Wyche
(74) *Attorney, Agent, or Firm* — Eversheds Sutherland (US) LLP (57) ABSTRACT

Disclosed are various embodiments for evaluating performance metrics (e.g., accuracy, depth precision, curvature accuracy, coverage, data acquisition time, etc.) of sensors (e.g., cameras, depth cameras, color cameras, etc.) according to captured image data. One or more reference boards having different types of reference structures (e.g., three-dimensional shapes, materials, three-dimensional patterns (e.g., waves, steps, etc.), gaps, etc.) that are used to evaluate the performance properties of a sensor. A reference board is attached to a robotic arm and positioned in front of a sensor. The robotic arm positions the reference board in front the sensor in different viewpoints while the sensor captures image data associated with the reference board. The captured image data is compared with ground truth data associated with the reference board to determine performance metrics of the sensor.

20 Claims, 8 Drawing Sheets

DEPTH SENSOR EVALUATION

BACKGROUND

Depth data corresponds a map of pixel data corresponding to depth-related information of one or more objects. In particular, the depth data represents information relating to the distance of the surfaces with respect to the one or more objects from a given viewpoint. There are a wide range of technologies and devices (e.g., depth sensors) for generating depth data. Based on the various characteristics and manufacturing of the different types of depth technologies and devices, the quality and performance of the different technologies and devices for a given use may differ from one another.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to evaluating performance metrics (e.g., accuracy, depth precision, curvature accuracy, coverage, data acquisition time, etc.) of sensors (e.g., cameras, depth cameras, color cameras, etc.) according to captured image data. In particular, the present disclosure relates to a robot-based performance evaluation system comprising a robotic arm, one or more sensors, a computing system, and one or more reference boards having different types of reference structures (e.g., three-dimensional shapes, materials, three-dimensional patterns (e.g., waves, steps, etc.), gaps, etc.) that can be used to evaluate the performance properties of a sensor. According to various examples, a reference board is attached to a robotic arm and positioned in front of a sensor. The robotic arm is configured to present the reference board to the sensor in different viewpoints or in motion while the sensor captures image data associated with the reference board. The captured image data comprising point cloud depth data representing the reference board is analyzed and compared with ground truth data associated with the reference board to determine the performance metrics of the sensor. As different sensors may have different performance metrics, various different sensors may be evaluated and a particular sensor can be selected from the different sensors for a given use case based at least in part on the associated performance metrics.

Figure 1:
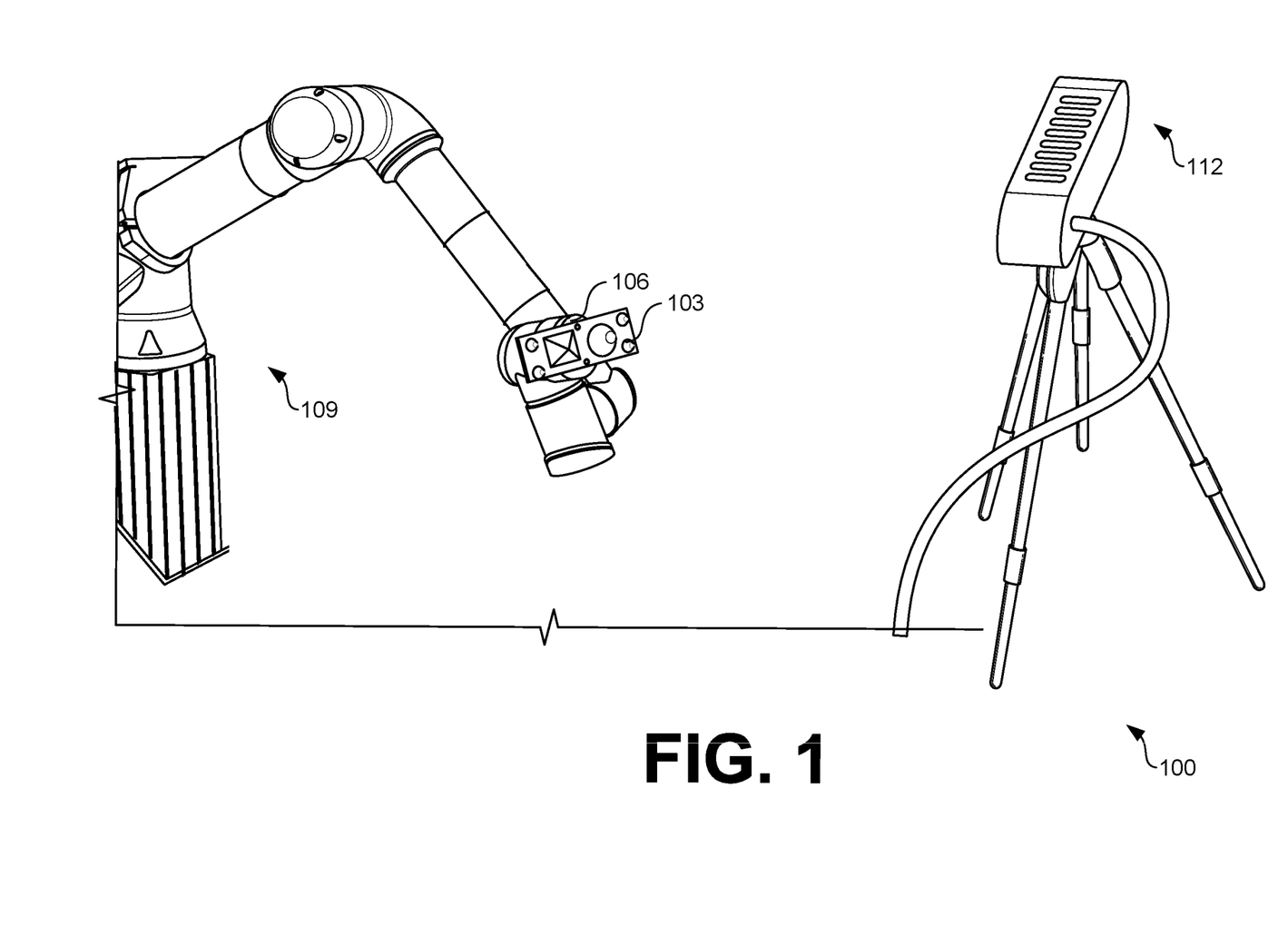
FIG. 1 is a drawing of an example scenario involving a robotic-based sensor evaluation system according to various embodiments of the present disclosure.

FIG. 1 illustrates an example scenario 100 associated with a performance evaluation system of the present disclosure. In particular, FIG. 1 illustrates an example of a reference board 103 attached to an end effector 106 of a robotic arm 109. The reference board 103 is positioned by the robotic arm 109 to face a sensor 112 that is to be evaluated. Although not illustrated in FIG. 1, the robotic arm 109 and the sensor 112 are in data communication with a computing environment 115 (FIG. 2) that includes a sensor evaluation application 118 (FIG. 2) for analyzing image data corresponding to the reference board 103 that is captured by the sensor 112 to determine performance metrics associated with the sensor 112.

As will be discussed in greater detail with respect to FIGS. 3A-3D and FIG. 4, the reference board(s) 103 comprises a plurality of reference structures 121 (FIGS. 3A-3D and FIG. 4) that differ from one another in at least one of a shape, a size, an angle, a pattern, a material, and/or other type of feature. The different reference features of the reference structures 121 can be captured by a sensor in the form of image data comprising point cloud data. The various types of reference features can be used to identify differences and/or similarities between the captured image data and the ground truth data in order to calculate the performance metrics for a given sensor 112.

According to various examples, the performance metrics are calculated by comparing the captured image data corresponding to the reference board 103 with predefined ground truth data associated with the reference board. In various examples, the ground truth data may be defined according to an analysis of one or more models used to create the given board. For example, a reference board 103 may be created using a three-dimensional (3D) printing technique and a computer-aided design (CAD) model. In this example, the ground truth data may be defined by uniformly sampling points (e.g., 1,000,000) from the model to generate the ground truth data comprising a high density ground truth point cloud.

The performance metrics may comprise an overall accuracy metric, a precision metric, a curvature accuracy metric, a coverage metric, a data acquisition time, and/or other types of performance metrics. The overall accuracy metric corresponds the overall error associated with the comparison of the captured image data and the ground truth data. For example, the overall accuracy may correspond to the root mean squared error of each point in a generated point cloud. This may be determined by computing the nearest neighbor in a captured point cloud of the captured image data for every point in the ground truth point cloud. The precision metric corresponds to a depth unit for a sensor 112. The precision can be determined by capturing multiple depth images from a static scene and computing the mean standard deviation of all pixels over time. In various examples, the precision metric is expressed in millimeters.

The curvature accuracy metric corresponds to how accurate the sensor captures and/or distorts the curvature of a given object. The curvature accuracy may be determined by computing the Gaussian curvature associated with a random selection of points in the point cloud of the captured image data and computing the root mean squared error of it compared to that of the ground truth point cloud. The coverage metric relates to defining the amount of coverage the sensor 112 is able to capture of a given object. For example, the coverage may be determined by sampling the captured point cloud with the ground truth point cloud on a small-sized voxel grid (e.g., two millimeters) and comparing the different samplings to identify matches. The coverage is the percentage of points where there is a match. The data acquisition time metric corresponds to the time between the trigger of the sensor 112 for capturing an image and the actual capturing of the point cloud data associated with the image by the sensor. In various examples, the data acquisition time is calculated in milliseconds or other types of units of time.

According to various examples, upon determining the performance metrics for a given sensor 112, a report can be generated indicating the performance metrics for the sensor 112. In some examples, the report can include a point cloud representation image illustrating the point cloud that was captured by the given image in relation to the ground truth representation. In other examples, the report can include performance metrics associated with multiple sensors 112 that are evaluated. In various embodiments, a user interface can be generated to incorporate the report and can be transmitted to a client device associated with a user or entity and rendered on the client device for review.

In the following discussion, a general description of the system and its components is provided, followed by a discussion of the operation of the same.

Figure 2:
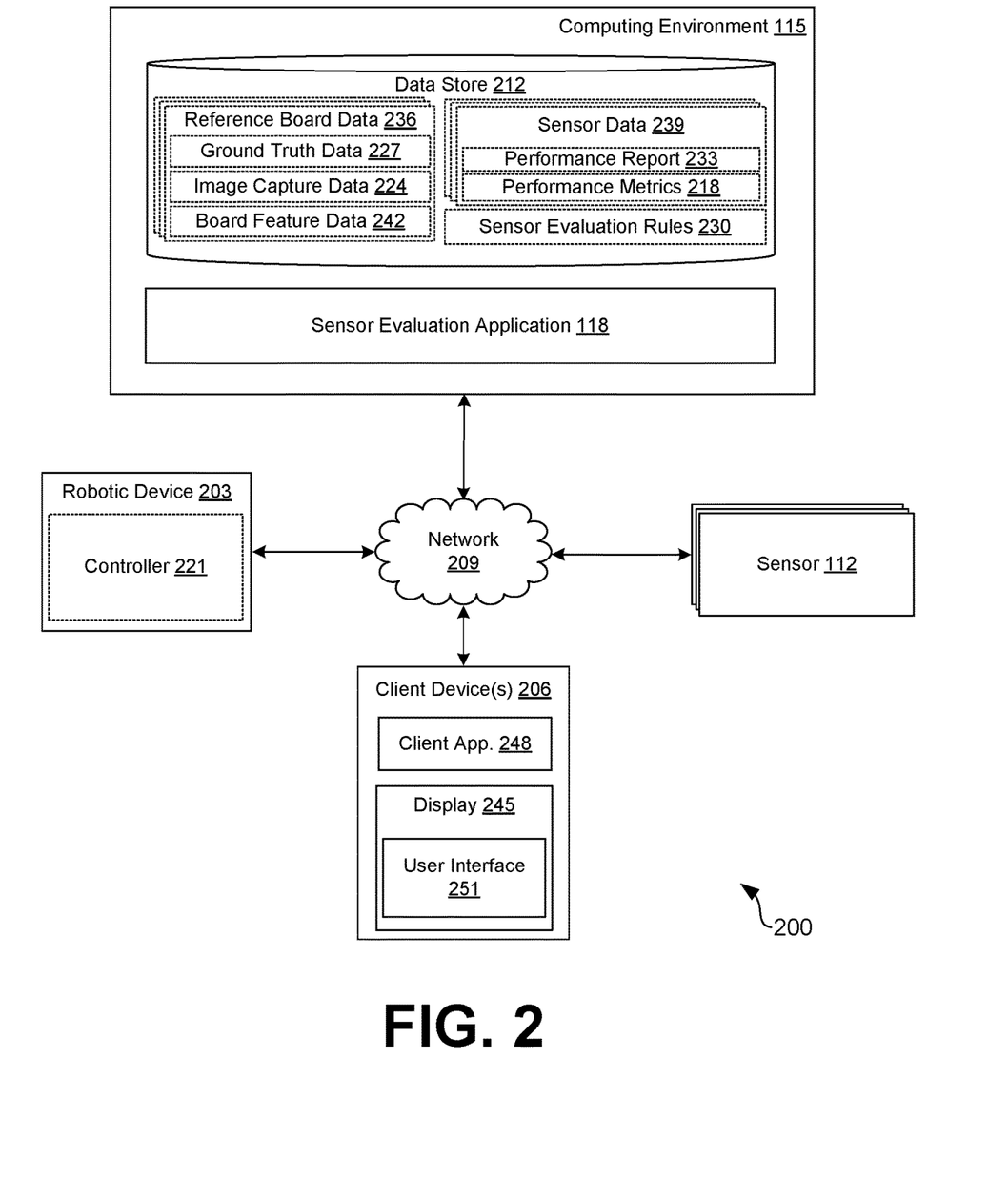
FIG. 2 is a schematic block diagram of a networked environment according to various embodiments of the present disclosure.

With reference to FIG. 2, shown is a networked environment 200 according to various embodiments. The networked environment 200 includes a computing environment 115, a robotic device 203, one or more sensors 112, and a client device 206, which are in data communication with each other via a network 209. The network 209 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 115 may comprise, for example, a server computer or any other system providing computing capability. Alternatively, the computing environment 115 may employ a plurality of computing devices that may be arranged, for example, in one or more server banks or computer banks or other arrangements. Such computing devices may be located in a single installation or may be distributed among many different geographical locations. For example, the computing environment 115 may include a plurality of computing devices that together may comprise a hosted computing resource, a grid computing resource, and/or any other distributed computing arrangement. In some cases, the computing environment 115 may correspond to an elastic computing resource where the allotted capacity of processing, network, storage, or other computing-related resources may vary over time.

Various applications and/or other functionality may be executed in the computing environment 115 according to various embodiments. Also, various data is stored in a data store 212 that is accessible to the computing environment 115. The data store 212 may be representative of a plurality of data stores 212 as can be appreciated. The data stored in the data store 212, for example, is associated with the operation of the various applications and/or functional entities described below.

The components executed on the computing environment 115, for example, include a sensor evaluation application 118, and other applications, services, processes, systems, engines, or functionality not discussed in detail herein. The sensor evaluation application 118 is executed to analyze image capture data 224 obtained from the sensor 112 and to determine performance metrics 218 associated with sensor 112. In various examples, the sensor evaluation application 118 may interact with a controller 221 of the robotic device 203 and direct the robotic device 203 to position a reference board 103 at a given position and/or movement. Upon determining that the reference board 103 is at the given position and/or movement, the sensor evaluation application 118 can direct the sensor 112 to capture an image associated with the reference board 103.

According to various examples, the sensor evaluation application 118 may analyze the cloud point data included with the image capture data 224 that is obtained from the sensor 112 and extract the cloud point data that corresponds to the reference board 103. For example, the image capture data 224 may include cloud point data associated with the reference board 103 as well as surrounding objects to the reference board 103, such as for example, the robotic device 203 or other objects. Upon identifying the data corresponding to the reference board 103, the sensor evaluation application 118 compares the point cloud data that is captured with the ground truth data 227. The sensor evaluation application 118 may apply various techniques and algorithms defined in the sensor evaluation rules 230 to calculate or otherwise determine the performance metrics of the sensor 112.

In various examples, the sensor evaluation application 118 may generate a performance report 233 that includes the performance metrics 218 for one or more sensors 112. In some examples, the performance report 233 includes a point cloud data representation of the captured reference board 103. In some examples, the sensor evaluation application 118 includes a comparison of performance metrics 218 for multiple sensors 112 allowing a user to review the performance metrics 218 and determine tradeoffs between the performance metrics 218 of different sensors 112 when selecting a sensor 112 for a given task.

The data stored in the data store 212 includes, for example, reference board data 236, sensor data 239, sensor evaluation rules 230, and potentially other data. The reference board data 236 corresponds to data associated with a given reference board 103 including, for example, the ground truth data 227, image capture data 224, board feature data 242, and/or other type of data. The ground truth data 227 corresponds to the data that defines the features of a reference board 103. In various examples, the ground truth data 227 may be defined according to an analysis of one or more models used to create the given board. For example, a reference board 103 may be created using a three-dimensional (3D) printing technique and a computer-aided design (CAD) model. In this example, the ground truth data may be defined by uniformly sampling points (e.g., 1,000,000) from the model to generate the ground truth data comprising a high density ground truth point cloud.

The image capture data 224 corresponds to image data that is captured by a sensor 112. The image capture data 224 may include the data acquisition time associated with the capturing of the image, one or more depth images, point cloud data of the objects captured by the sensor 112, and/or other data. For example, the point cloud data included in the image capture data 224 may correspond to the reference board 103 positioned in view of the sensor 112 as well as other surrounding objects of the reference board 103 that are in view of the sensor 112. The type of data included in the image capture data 224 may correspond to a type of sensor 112 capturing the data. For example, one type of sensor 112 may output point maps while another type of sensor 112 may output depth images.

The board feature data 242 comprises feature characteristics associated with a given reference board 103. For example, a reference board 103 may comprise different types of reference structures 121 (e.g., three-dimensional shapes, materials, three-dimensional patterns (e.g., waves, steps, etc.), gaps, etc.) that can be used to evaluate the performance properties of a sensor. In various examples, the reference structures 121 (FIGS. 3A-3D) may differ from one another in at least one of a shape, a size, an angle, a pattern, a material, or another type of feature. In the example of a material board, the reference structures 121 may comprise a plurality of materials that differ from one another based at least in part on at least one of a material type, a color, a level of transparency, a refractive index, or another type of feature. In various examples, the board feature data 242 may further comprise one or more dimensions of the reference board 103, a type of metric to be determined based on the type of reference board 103, and/or other data.

The sensor data 239 relates to data associated with a given sensor 112. For example, the sensor data 239 can comprise a sensor brand, a sensor version, a sensor name, one or more application programming interface (API) calls for communicating with the sensor 112, or other types of characteristic data. In addition, the sensor data 239 may comprise the performance report 233 and performance metrics 218 for the given sensor 112. The performance report 233 identifies the performance metrics 218 that are determined upon an evaluation of the sensor 112. The performance metrics 218 may comprise an overall accuracy metric, a precision metric, a curvature accuracy metric, a coverage metric, a data acquisition time, and/or other types of performance metrics.

The sensor evaluation rules 230 include rules, models, and/or configuration data for the various algorithms or approaches employed by the sensor evaluation application 118. For example, the sensor evaluation rules 230 can include the various models and/or algorithms used by the sensor evaluation application 118 in analyzing the image capture data 224 and ground truth data 227 associated with a given reference board 103 to determine or otherwise calculate the performance metrics 218 for a given sensor 112.

The sensor 112 may comprise a camera device that captures a video or an image of one or more objects positioned in the viewing range of the sensor 112. In various examples, the sensor 112 comprises a depth camera that is configured to capture the width, height, area, volume, etc. of one or more objects placed in the viewing frame of the sensor 112. A non-limiting and exemplary list of sensors 112 include REALSENCE™ SR305, KINECT® AZURE, ENSENSO N35, and ENSENSO X36. However, it should be noted that the types of sensors 112 that can be evaluated are not limited to the exemplary list provided, and may include any type of camera device as can be appreciated. In various examples, the sensor 112 may capture a video or an image of the reference board 103 upon the direction of the sensor evaluation application 118.

The robotic device 203 may comprise robotic arms 109 and/or any other mechanical device configured to effect movements of reference board 103. The robotic device 203 may be used to move the attached reference board 103 at a plurality of angles about one or more axes. For example, the robotic device 203 may move the reference board 103 in three different positions at around 0 degrees, and 45 degrees plus and minus around the axis of gravity. In other examples, the robotic device 203 may move the reference board 103 less or more angles and about multiple axes relative to the reference board 103. In various examples, the robotic device 203 comprises a robotic arm 109 to have multiple degrees of freedom. In some examples, the robotic arm 109 comprises at least six degrees of freedom. A non-limiting example of a robotic device 203 includes a UNIVERSAL ROBOTS® 10e robot.

The robotic device 203 is controlled by a controller 221 that is executed to control the movement of the robotic device 203. In various examples, the controller 221 may be in data communication with the sensor evaluation application 118 and may provide positioning information associated with a positioning of an attached reference board 103 to the sensor evaluation application 118. In addition, the sensor evaluation application 118 may activate the movement of the robotic device 203 via interactions with the controller 221 and may direct the controller 221 to move the robotic device 203 into one or more different positions.

The client device 206 is representative of a plurality of client devices that may be coupled to the network 209. The client device 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The client device 206 may include a display 245. The display 245 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 206 may be configured to execute various applications such as a client application 248 and/or other applications. The client application 248 may be executed in a client device 206, for example, to access network content served up by the computing environment 115 and/or other servers, thereby rendering a user interface 251 on the display 245. To this end, the client application 248 may comprise, for example, a browser, a dedicated application, etc., and the user interface 251 may comprise a network page, an application screen, etc. The client device 206 may be configured to execute applications beyond the client application 248 such as, for example, email applications, social networking applications, word processors, spreadsheets, and/or other applications.

Moving on to FIGS. 3A-3D and FIG. 4, shown are examples of reference boards 103 (e.g., 103a, 103b, 103c, 103d, and 103e) according to various examples. According to various examples, the reference boards 103 of FIGS. 3A-3D and FIG. 4 may be manufactured with a zero to minimally reflective material such as, for example, acrylic glass, matted plastic, or another type of minimally reflective material such that the material type of the reference boards 103 does not interfere with depth precision.

A reference board 103 may comprise different types of reference structures 121 (e.g., three-dimensional shapes, materials, three-dimensional patterns (e.g., waves, steps, etc.), dimensions, gaps, etc.) that can be used to evaluate the performance properties of a sensor 112. In various examples, the reference structures 121 may differ from one another in at least one of a shape, a dimension, an angle, a pattern, a material, or other type of feature. It should be noted that while FIGS. 3A-3D and FIG. 4 illustrate different types of reference boards 103 with varying reference structures 121, in some examples, a reference board 103 may comprise one or more reference structures 121 of one or more of the example reference boards 103 described.

Figure 3A:
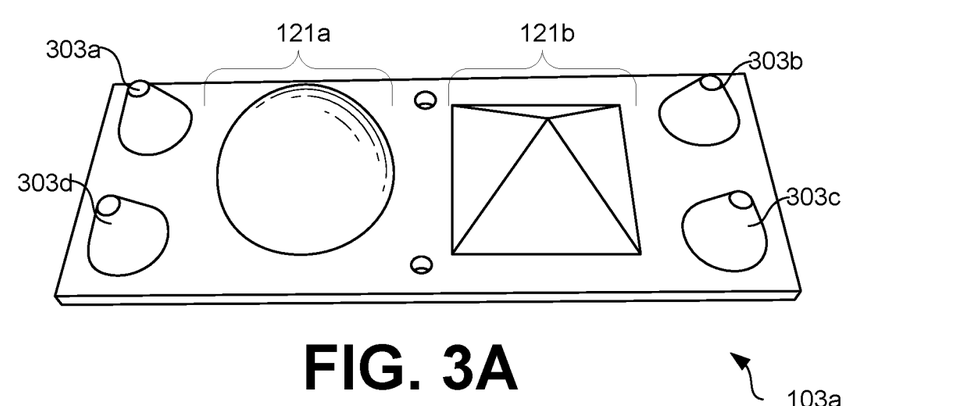
FIGS. 3A-3D are example reference boards having shapes of varying size, angles, and patterns according to various embodiments of the present disclosure.

FIGS. 3A-3D illustrate reference boards 103 comprising shape boards having different types of shapes, patterns, and angles. In particular, FIG. 3A illustrates a reference board 103a with reference structures 121 (e.g., 121a, 121b) comprising a three-dimensional half-sphere and a pyramid. The properties of the reference structures 121a, 121b of FIG. 3A provide for various angles to be captured by a sensor 112 at a given time. The ability to capture various angles increases the amount of data to be analyzed to provide for a better understanding of the sensor 112 when determining the performance metrics 218 for a given sensor 112. Although FIG. 3A illustrates a half sphere and a pyramid, any type of three-dimensional shape (e.g., cube, cylinder, cone, prism, etc.) may be used as a reference structure 121.

Figure 4:
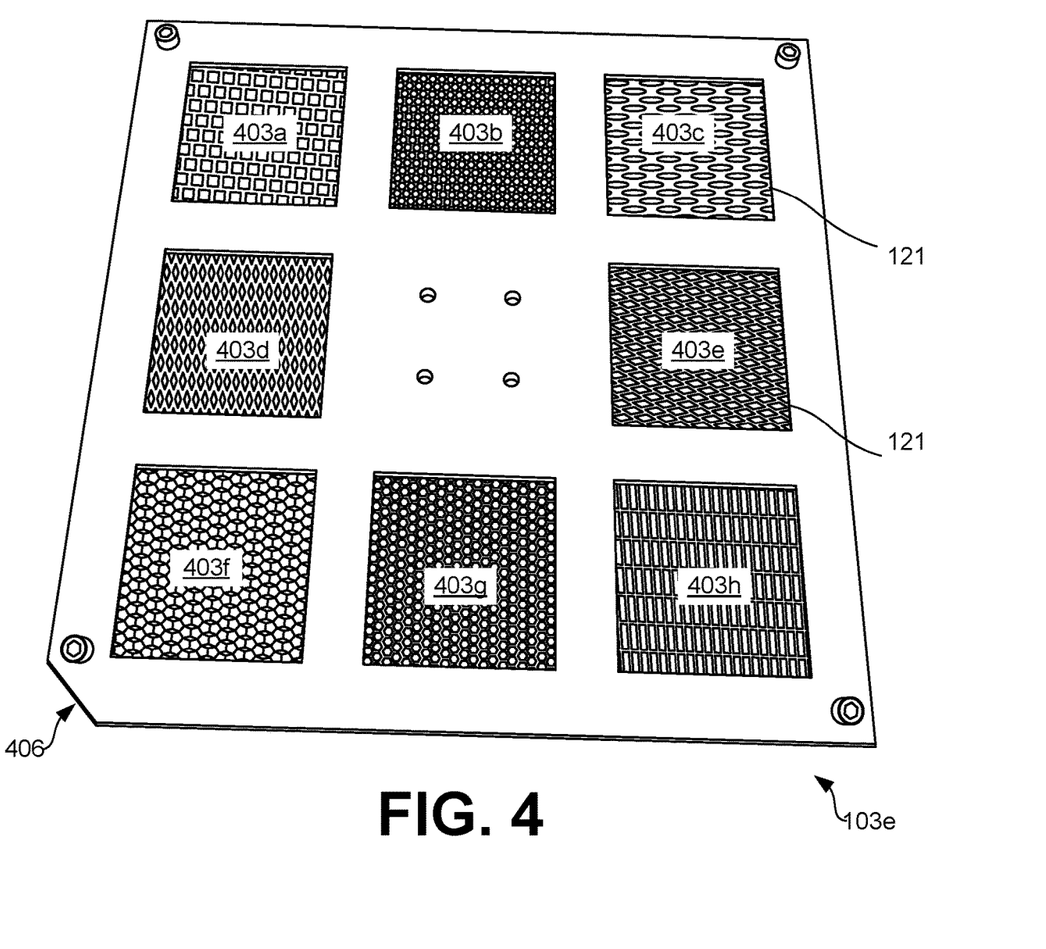
FIG. 4 is an example reference board having different types of material according to various embodiments of the present disclosure.

FIG. 3A further illustrates a plurality of alignment structures 303 (e.g., 303a, 303b, 303c, 303d) disposed along the edges and corners of the reference board 103a. In various examples, the alignments structures 303 are used to align the captured reference board 103 with the ground truth data 227 when comparing the image capture data 224 with the ground truth data 227. Although the reference board of FIG. 3A illustrates four alignment structures 303a-303d positioned at the corners of the reference board 103, in some examples, the alignments structures 303 may be disposed asymmetrically along the reference board 103 to keep the alignment from being off by 180 degrees. For example, a reference board 103 may only comprise three alignment structures 303 where one corner of the reference board lacks an alignment structure 303. In another example, as shown in FIG. 4, one or more corners of the reference board may have a cutout portion 406 or another type of identifying feature that can be used to align the image capture data 224 from the ground truth data 227. Further, while the alignment structures 303 are illustrated as three-dimensional cones in FIG. 3A, the alignment structures 303 can comprise any type of shape, aperture, cutout, or identifying feature as can appreciated.

Figure 3B:
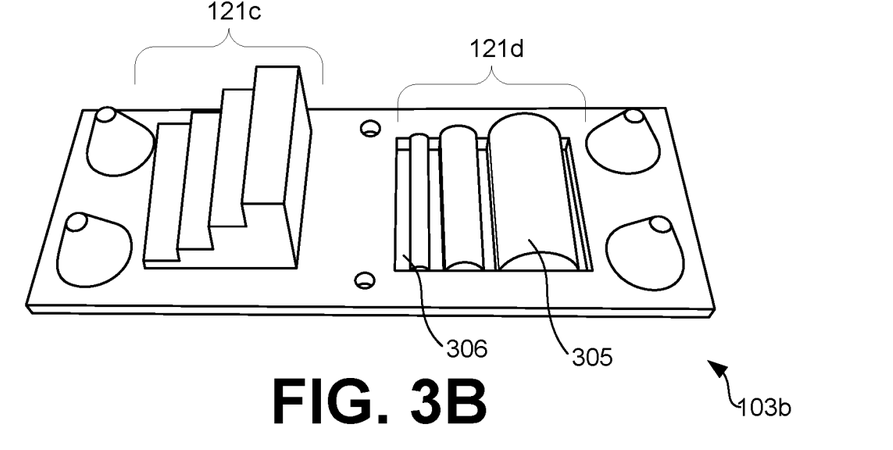

Turning now to FIG. 3B, shown is an example of a reference board 103b comprising a shape board according to various embodiments of the present disclosure. In the reference board 103b of FIG. 3B, shown are reference structures 121 (e.g., 121c, 121d) corresponding to patterns of differing heights, shapes, and angles. For example, reference structure 121c includes a three-dimensional object corresponding to steps with differing heights. Reference structure 121d includes a plurality of three-dimensional cylinders 305 of different diameters that are spaced apart by gaps 306 in body of the reference board 103b.

The features of the reference structures 121 of FIG. 3B are used to capture the depth accuracy and depth resolution of the sensor 112. As each step or object increases in size, the depth accuracy and depth resolution may begin to fade. For example, for a low resolution sensor 112, the depth accuracy and depth resolution may fade earlier with the higher steps. In addition, the gaps 306 included in the reference structure 121d are useful for analyzing the image capture data 224 since some sensors 112 may invent points for gaps 306 included in a given reference structure 121 or object. Further, spatial resolution for a given sensor 112 can be evaluated based on how the sensor 112 captures the gaps 306 as the shapes (e.g., cylinders 305) spaced by the gaps 306 increase in diameter.

Figure 3C:
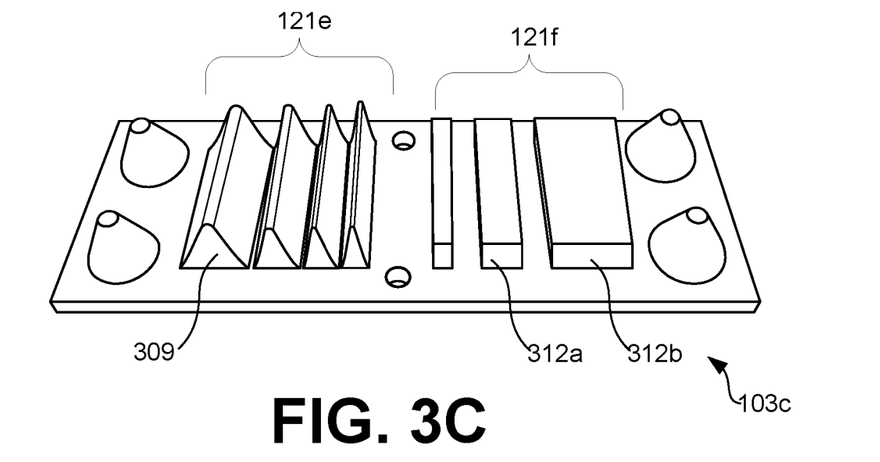
Figure 3D:
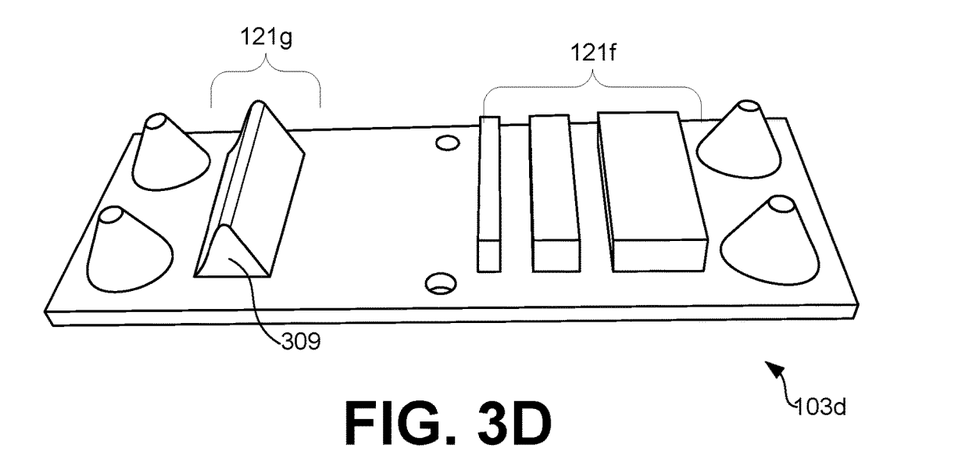

Moving on to FIG. 3C, shown is an example of a reference board 103c comprising a shape board according to various embodiments of the present disclosure. In the reference board 103c of FIG. 3C, shown are reference structures 121 (e.g., 121e, 121f) corresponding to patterns of differing heights, shapes, and angles. In particular, reference structure 121e comprises a wave form to cover a variety of curvature between shapes. Reference structure 121f comprises a set of boxes 312 (e.g., 312a, 312b) of differing widths with spaces between each of the boxes 312. FIG. 3D differs from FIG. 3C in that the reference structure 121g of FIG. 3D comprises a wave form having only one wave structure 309 where the reference structure 121e of FIG. 3C comprises a wave form with multiple wave structures 309.

The wave forms included in the reference boards 103 of FIGS. 3C and 3D are used to determine or otherwise measure the curvature accuracy of a given sensor 112. In particular, the linear increase of the curvature is analyzed in the image capture data 224 relative to the ground truth data 227 to determine the curvature accuracy metric of the given sensor 112.

FIG. 4 illustrates an example of reference board 103e comprising a material board having multiple different types of materials 403 (e.g., 403a, 403b, 403c, 403d, 403e, 403f, 403g, 403h). In the example of the material board, the reference structures 121 may comprise different types of material 403 that differ from one another based at least in part on at least one of a material type, a color, a level of transparency, a refractive index, or another type of feature. For example, the different types of material may include a matte cardboard, a glossy cardboard, a white fabric, a gray fabric, a matte black fabric, a retroreflective tape, a blister pack hard plastic, a plastic bag, or another type of material that differs in at least one of a type, a color, a level of transparency, a refractive index or another type of feature. The analysis of the material board that comprises materials 403 with different types of features can be used to better determine and understand the performance metrics 218 of a given sensor as some sensors 112 may have difficulty with capturing images of objects according to the different types of features.

Figure 5:
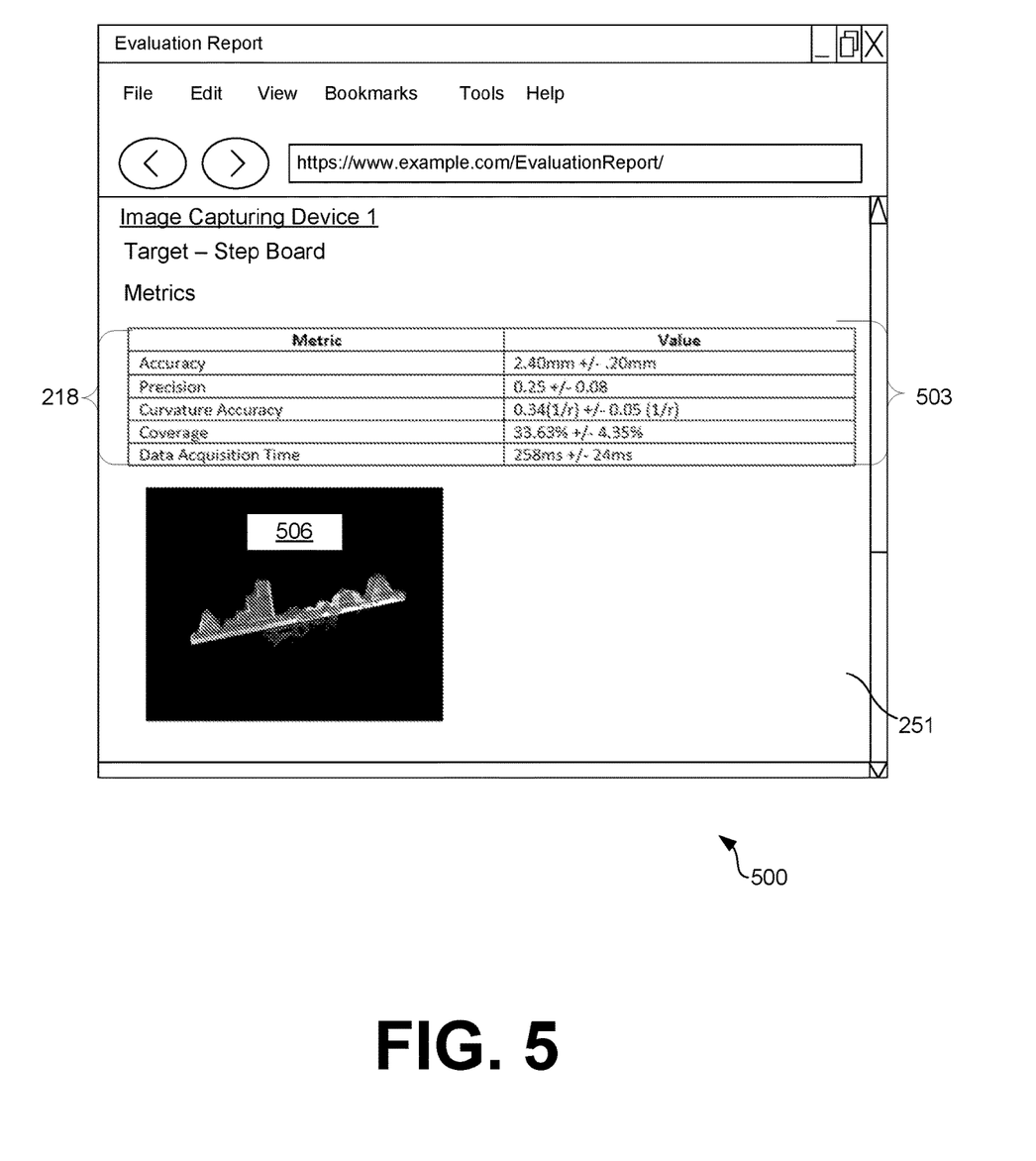
FIG. 5 is a pictorial diagram of an example user interface rendered by a client in the networked environment of FIG. 2 according to various embodiments of the present disclosure.

Referring next to FIG. 5, shown is an example 500 of a user interface 251 rendered by a client device 206 that includes the performance report 233 of a given sensor 112 according to various embodiments of the present disclosure. In this example, the evaluated sensor 112 corresponds to "Image Capturing Device 1." The performance report 233 includes an identification of the various determined performance metrics 218 and the corresponding metric values 503 for the sensor 112 following an evaluation of the sensor 112 according to the embodiments of the present disclosure. In some examples, the performances metrics 218 may correspond to metrics 218 calculated for a given type of reference board 103. In some examples, the performance report 233 may include averages of the metric values 503 for a given performance metric 218 based on the metric values 503 calculated for each of the different types of reference boards 103 for the sensor 112. For example, the performance report 233 of FIG. 5 include metric values 503 calculated for the data associated with a step board (e.g., FIG. 3B). However, if image capture data 224 is obtained for each of the types of reference boards 103 shown in FIGS. 3A-3C, the metric values 503 may differ and an average of the different metric values 503 for each of the different performance metrics 218 may be included in the performance report 233.

In addition, the user interface 251 of FIG. 5 includes a point cloud representation 506 of the reference board 103 based on the image capture data 224 obtained from the sensor 112. In some examples, the performance report 233 may comprise an identification of multiple sensors evaluated and include a comparison of the performance metrics 218 and corresponding metric values 503 for each of the evaluated sensors 112.

Figure 6:
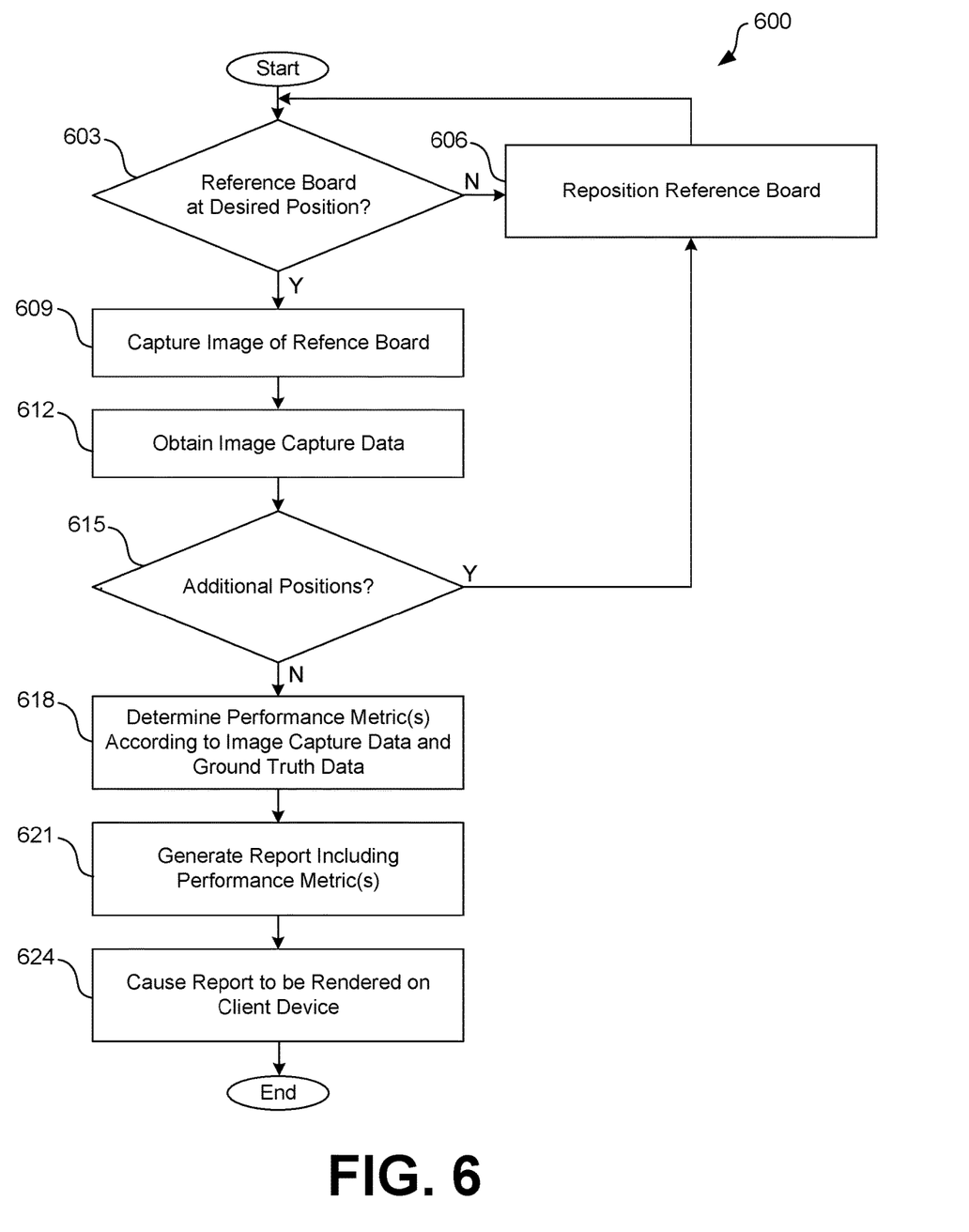
FIG. 6 is a flowchart illustrating one example of functionality implemented as portions of the sensor evaluation application executed in a computing environment in the networked environment of FIG. 2 according to various embodiments of the present disclosure.
Figure 7:
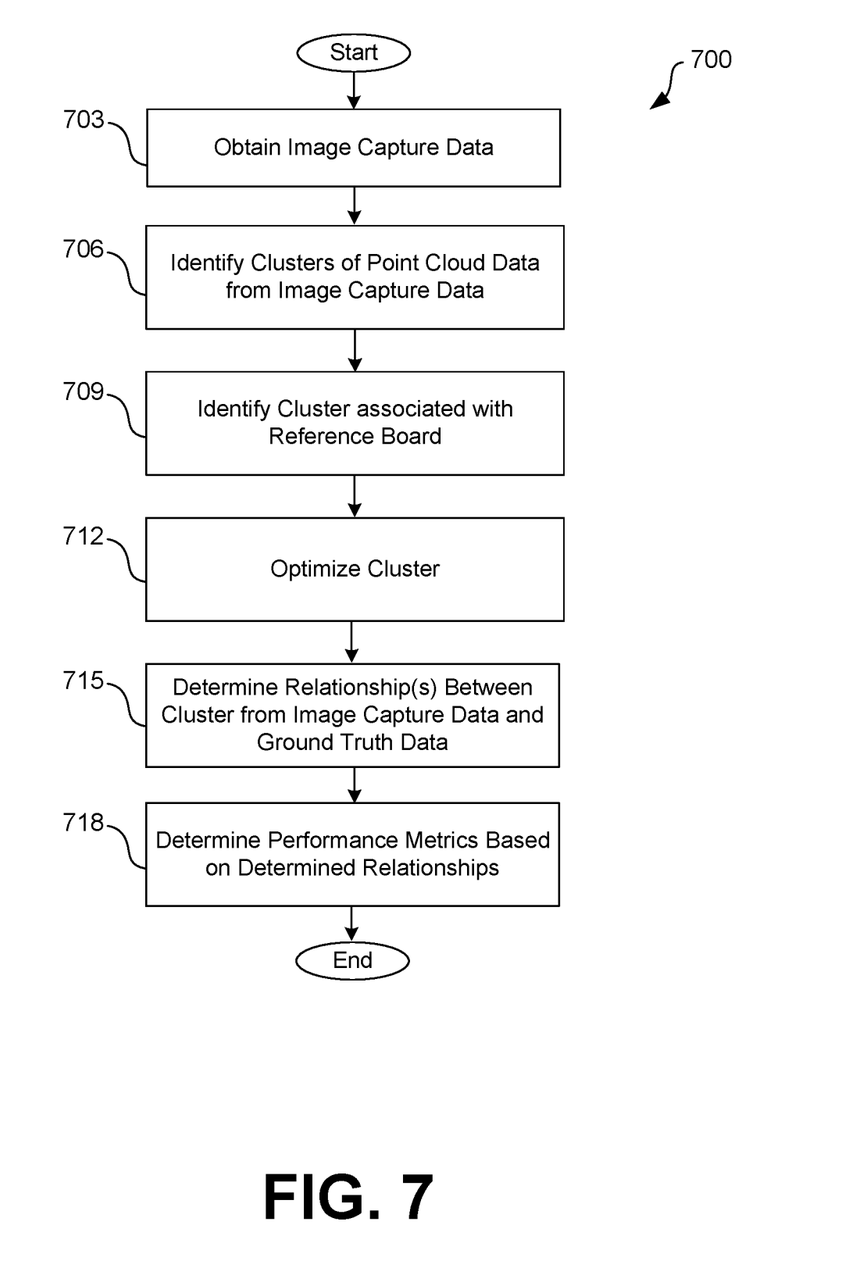
FIG. 7 is a flowchart illustrating one example of functionality implemented as portions of the sensor evaluation application executed in a computing environment in the networked environment of FIG. 2 according to various embodiments of the present disclosure.

Next, a general description of the operation of the various components of the networked environment 200 is provided with respect to FIGS. 6 and 7. To begin, FIG. 6 illustrates a flowchart 600 that provides one example of the operation of a portion of the sensor evaluation application 118 according to various embodiments. It is understood that the flowchart of FIG. 6 provides merely an example of the many different types of functional arrangements that may be employed to implement the operation of the portion of the sensor evaluation application 118 as described herein. As an alternative, the flowchart of FIG. 6 may be viewed as depicting an example of elements of a method implemented in the computing environment 115 (FIG. 2) according to one or more embodiments.

Beginning with box 603, the sensor evaluation application 118 determines if a reference board 103 attached to a robotic arm 109 of a robotic device 203 is positioned at an appropriate position. The appropriate position may correspond to a distance and/or angles of the reference board 103 relative to a sensor 112 being evaluated. In some examples the sensor evaluation application 118 may interact with a controller 221 of the robotic device 203 to obtain a positioning of the reference board 103. In other examples, a user interacting with a user interface 251 of the sensor evaluation application 118 may indicate via interactions with the user interface 251 that the reference board 103 is in an appropriate position. In various examples, the robotic arm 109 positions the reference board 103 in a view field of a sensor 112 to allow the sensor 112 to capture a video or image of the reference board 103. In a non-limiting example, the reference board 103 may be positioned at around a distance from the sensor 112 that is based at least in part on a focal range of the sensor 112. For example, for one type of sensor 112, the reference board 103 may be positioned at 60 mm from the sensor 112 and for another type of sensor, the reference board 103 may be positioned at 110 mm from the sensor. If the reference board 103 is determined to not be at the desired position, the sensor evaluation application 118 proceeds to box 606. Otherwise, the sensor evaluation application 118 proceeds to box 609.

At box 606, the sensor evaluation application 118 may interact with the controller 221 of the robotic device 203 to invoke movement of the robotic arm 109 to reposition the reference board 103 to a desired position. For example, the robotic arm 109 may move the reference board 103 into a variety of positions and/or angles about an axis of gravity or other axes in order to allow the sensor 112 to capture image capture data 224 for a given reference board 103. The sensor evaluation application 118 may indicate the desired position (e.g., angle or location) of the reference board 103 when invoking the movement of the robotic arm 109. In some examples, the sensor evaluation application 118 may invoke an API call that identifies a desired position of the reference board 103.

At box 609, the sensor evaluation application 118 causes the sensor 112 to capture an image that includes the reference board 103. For example, upon determining that the reference board 103 is at a desired position, the sensor evaluation application 118 can invoke the sensor 112 to obtain the image capture data 224. In some examples, the sensor evaluation application 118 communicates with the sensor 112 via an API call associated with the sensor 112. In some examples, the sensor 112 captures an image of the reference board 103 while the reference board 103 is in a static position. In other examples, the sensor 112 captures an image of the reference board 103 while the reference board 103 is moving via the movement of the robotic arm 109.

At box 612, the sensor evaluation application 118 obtains the image capture data 224 from the sensor 112. In particular, the image capture data 224 corresponds to image data that is captured by a sensor 112. The image capture data 224 may include the data acquisition time associated with the capturing of the image, one or more depth images, point cloud data of the objects captured by the sensor 112, and/or other data. For example, the point cloud data included in the image capture data 224 may correspond to the reference board 103 positioned in view of the sensor 112 as well as other surrounding objects of the reference board 103 that are in view of the sensor 112.

At box 615, the sensor evaluation application 118 determines if there are additional positions of the reference board 103. For example, for a given evaluation, the sensor evaluation application 118 may consider image capture data 224 corresponding to multiple angles about a given axis (e.g., axis of gravity) relative to the reference board 103. If the sensor evaluation application 118 determines that image capture data 224 has been obtained for all desired positions, the sensor evaluation application 118 proceeds to box 618. Otherwise, the sensor evaluation application 118 proceeds to box 606.

At box 618, the sensor evaluation application 118 determines the performance metrics 218 for the sensor 112 according to the image capture data 224 and the ground truth data 227 for the sensor 112. For example, the sensor evaluation application 118 may determine the performance metrics by comparing the image capture data 224 corresponding to the reference board 103 with predefined ground truth data 227 associated with the reference board 103. In various examples, the ground truth data 227 may be defined according to an analysis of one or more models used to create the given reference board 103.

The performance metrics 218 may comprise an overall accuracy metric, a precision metric, a curvature accuracy metric, a coverage metric, a data acquisition time, and/or other types of performance metrics. The overall accuracy metric corresponds the overall error associated with the comparison of the image capture data 224 and the ground truth data 227. For example, the overall accuracy may correspond to the root mean squared error of each point in a generated point cloud. This may be determined by computing the nearest neighbor in a captured point cloud of the image capture data 224 for every point in the ground truth point cloud. The precision metric corresponds to a depth unit for a sensor 112. The precision can be determined by capturing multiple depth images from a static scene and computing the mean standard deviation of all pixels over time. In various examples, the precision metric is expressed in millimeters.

The curvature accuracy metric corresponds to how accurate the sensor captures and/or distorts the curvature of one or more reference structures 121 of a reference board 103. The curvature accuracy may be determined by computing the Gaussian curvature associated with a random selection of points in the point cloud of the image capture data 224 and computing the root mean squared error of it compared to that of the ground truth point cloud. The coverage metric relates to defining the amount of coverage the sensor 112 is able to capture of the one or more reference structures 121 of the reference board 103. For example, the coverage may be determined by sampling the captured point cloud of the image capture data 224 with the ground truth point cloud on a small-sized voxel grid (e.g., two millimeters) and comparing the different samplings to identify matches.

The coverage is the percentage of points where there is a match. The data acquisition time metric corresponds to the time between the trigger of the sensor 112 for capturing an image and the actual capturing of the point cloud data associated with the image by the sensor 112. The data acquisition time metric may be included in the image capture data 224 obtained from the sensor 112. In other examples, the data acquisition time metric is calculated according to a time that sensor 112 was invoked to capture the image and a time that the sensor evaluation application 118 obtains the image capture data 224.

At box 621, the sensor evaluation application 118 generates the performance report 233 for the given sensor 112. The performance report 233 includes an identification of the various determined performance metrics 218 and the corresponding metric values 503 for a sensor 112 following an evaluation of the sensor 112 according to the embodiments of the present disclosure. In various examples, the sensor evaluation application 118 generates a user interface 251 including the performance report 233. In some examples, the report further includes a point cloud representation 506 of the reference board 103 based on the image capture data 224 obtained from the sensor 112. In some examples, the point cloud representation 506 includes a 3D view of a reference board 103 to visually illustrate how the 3D view compares to the 3D rendering of the image capture data 224. In some examples, the performance report 233 may comprise an identification of multiple sensors evaluated and include a comparison of the performance metrics 218 and corresponding metric values 503 for each of the evaluated sensors 112.

At box 624, the sensor evaluation application 118 causes the report to be rendered on the client device 206. In one or more examples, the sensor evaluation application 118 transmits, to the client device 206, the report data comprising user interface code that is executable by the client application 248 to generate and render a user interface 251 comprising the performance report 233 on the client device 206. In other examples, the sensor evaluation application 118 transmits a generated user interface 251 comprising the performance report 233 to the client device 206 for rendering. For example, the sensor evaluation application 118 sends data associated with the generated user interface 251 in response to an application programming interface (API) call from the client application 248. Thereafter, this portion of the process proceeds to completion.

Referring next to FIG. 7, shown is a flowchart 700 that provides one example of the operation of a portion of the sensor evaluation application 118 according to various embodiments. It is understood that the flowchart of FIG. 7 provides merely an example of the many different types of functional arrangements that may be employed to implement the operation of the portion of the sensor evaluation application 118 as described herein. As an alternative, the flowchart of FIG. 7 may be viewed as depicting an example of elements of a method implemented in the computing environment 115 (FIG. 2) according to one or more embodiments.

Beginning with box 703, the sensor evaluation application 118 obtains the image capture data 224 from the sensor 112. In particular, the image capture data 224 corresponds to image data that is captured by a sensor 112. The image capture data 224 may include the data acquisition time associated with the capturing of the image, one or more depth images, point cloud data of the objects captured by the sensor 112, and/or other data. For example, the point cloud data included in the image capture data 224 may correspond to the reference board 103 positioned in view of the sensor 112 as well as other surrounding objects of the reference board 103 that are in view of the sensor 112.

At box 706, the sensor evaluation application 118 identifies one or more clusters of point cloud data in the image capture data 224. The one or more clusters may correspond to the reference board 103 and surrounding objects, such as, for example, the robot arm 109. For example, the sensor evaluation application 118 may apply a density-based spatial clustering of applications with a noise (DBSCAN) algorithm defined in the sensor evaluation rules 230 to cluster the point cloud data into multiple cluster dense point clouds.

At box 709, the sensor evaluation application 118 identifies a reference board cluster of data points from the clusters of dense point clouds. For example, the sensor evaluation application 118 may move each of the dense point cloud clusters $C_i$ at a center of a ground truth point cloud of the ground truth data 227 and save the transformation $T_1^{C_i}$. Upon saving the transformation $T_1^{C_i}$, a random sample consensus (RANSAC) algorithm defined in the sensor evaluation rules 230 may be applied to each cluster $C_i$ with the ground truth point cloud as the target. The RANSAC output $T_2^{C_i}$ comprises a transformation associated with the point clouds clusters being downsized. The cluster C* having the highest number of inliers is selected as the reference board cluster. In alternative examples, all point clouds can be visually displayed on a user interface 251 and a user may select a given point cloud cluster as being the reference board cluster via interactions with the user interface 251.

At box 712, the sensor evaluation application 118 optimizes the reference board cluster of point clouds. For example, the sensor evaluation application 118 may create symmetry versions $S_i$ of the cluster. This may include rotations around relative x, y, and z axes and combination. The symmetry transformations $T_{S_i}^{C*}$ may be saved. Next, the sensor evaluation application 118 applies optimization steps to each symmetry version. For example, a symmetry version S* having the lowest cost is selected and a correspondence set between the ground truth point cloud and the captured cluster point cloud is generated. In various examples, the correspondence set is generated using a nearest neighbor search (e.g., k-d tree) algorithm defined in the sensor evaluation rules 230. Upon generating the correspondence set, the sensor evaluation application 118 minimizes the Euclidean distance between correspondence points with non-linear least squares optimization by optimizing the transformation $T_{Opt}^{S*}$ of the symmetry version S*.

At box 715, the sensor evaluation application 118 determines the relationship between the reference board cluster and the ground truth data 227. For example, the sensor evaluation application 118 computes the transformation $T^*=T_{Opt}{}^{S^*}T_{S_i}{}^{C^*}T_2{}^{C^*}T_1{}^{C^*}$ which corresponds to the transformation of the captured data to the ground truth point cloud.

At box 718, the sensor evaluation application 118 determines the performance metrics 218 for the sensor 112 according to transformation T*. For example, the sensor evaluation application 118 may determine the performance metrics by comparing the image capture data 224 corresponding to the reference board 103 with predefined ground truth data associated with the reference board 103. In various examples, the ground truth data 227 may be defined according to an analysis of one or more models used to create the given reference board 103.

The performance metrics 218 may comprise an overall accuracy metric, a precision metric, a curvature accuracy metric, a coverage metric, a data acquisition time, and/or other types of performance metrics. The overall accuracy metric corresponds the overall error associated with the comparison of the image capture data 224 and the ground truth data 227. For example, the overall accuracy may correspond to the root mean squared error of each point in a generated point cloud. This may be determined by computing the nearest neighbor in a captured point cloud of the image capture data 224 for every point in the ground truth point cloud. The precision metric corresponds to a depth unit for a sensor 112. The precision can be determined by capturing multiple depth images from a static scene and computing the mean standard deviation of all pixels over time.

The curvature accuracy metric corresponds to how accurate the sensor captures and/or distorts the curvature of one or more reference structures 121 of a reference board 103. The curvature accuracy may be determined by computing the Gaussian curvature associated with a random selection of points in the point cloud of the image capture data 224 and computing the root mean squared error of it compared to that of the ground truth point cloud. The coverage metric relates to defining the amount of coverage the sensor 112 is able to capture of the one or more reference structures 121 of the reference board 103. For example, the coverage may be determined by sampling the captured point cloud of the image capture data 224 with the ground truth point cloud on a small-sized voxel grid (e.g., two millimeters) and comparing the different samplings to identify matches.

The coverage is the percentage of points where there is a match. The data acquisition time metric corresponds to the time between the trigger of the sensor 112 for capturing an image and the actual capturing of the point cloud data associated with the image by the sensor 112. The data acquisition time metric may be included in the image capture data 224 obtained from the sensor 112. In other examples, the data acquisition time metric is calculated according to a time that the sensor 112 was invoked to capture the image and a time that the sensor evaluation application 118 obtains the image capture data 224. Thereafter, this portion of the process proceeds to completion.

Figure 8:
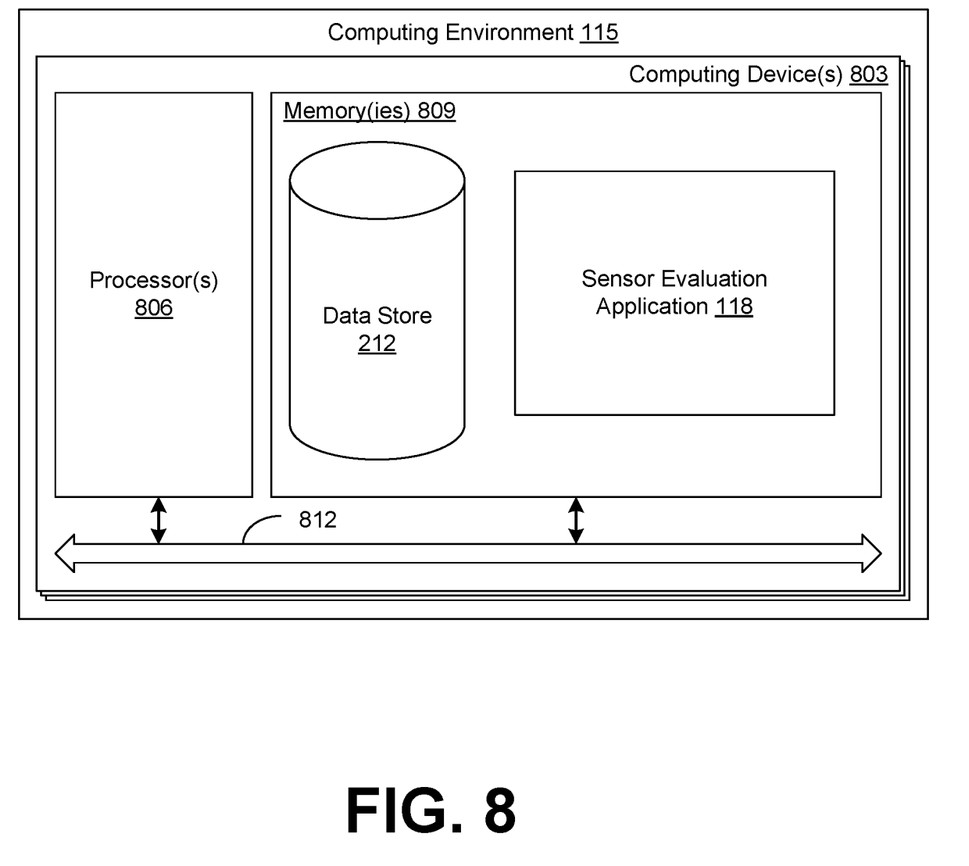
FIG. 8 is a schematic block diagram that provides one example illustration of a computing environment employed in the networked environment of FIG. 2 according to various embodiments of the present disclosure.

With reference to FIG. 8, shown is a schematic block diagram of the computing environment 115 according to an embodiment of the present disclosure. The computing environment 115 includes one or more computing devices 803. Each computing device 803 includes at least one processor circuit, for example, having a processor 806 and a memory 809, both of which are coupled to a local interface 812. To this end, each computing device 803 may comprise, for example, at least one server computer or like device. The local interface 812 may comprise, for example, a data bus with an accompanying address/control bus or other bus structure as can be appreciated.

Stored in the memory 809 are both data and several components that are executable by the processor 806. In particular, stored in the memory 809 and executable by the processor 806 is the sensor evaluation application 118, and potentially other applications. Also stored in the memory 809 may be a data store 212 and other data. In addition, an operating system may be stored in the memory 809 and executable by the processor 806.

It is understood that there may be other applications that are stored in the memory 809 and are executable by the processor 806 as can be appreciated. Where any component discussed herein is implemented in the form of software, any one of a number of programming languages may be employed such as, for example, C, C++, C#, Objective C, Java®, JavaScript®, Perl, PHP, Visual Basic® Python®, Ruby, Flash®, or other programming languages.

A number of software components are stored in the memory 809 and are executable by the processor 806. In this respect, the term "executable" means a program file that is in a form that can ultimately be run by the processor 806. Examples of executable programs may be, for example, a compiled program that can be translated into machine code in a format that can be loaded into a random access portion of the memory 809 and run by the processor 806, source code that may be expressed in proper format such as object code that is capable of being loaded into a random access portion of the memory 809 and executed by the processor 806, or source code that may be interpreted by another executable program to generate instructions in a random access portion of the memory 809 to be executed by the processor 806, etc. An executable program may be stored in any portion or component of the memory 809 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 809 is defined herein as including both volatile and nonvolatile memory and data storage components. Volatile components are those that do not retain data values upon loss of power. Nonvolatile components are those that retain data upon a loss of power. Thus, the memory 809 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 806 may represent multiple processors 806 and/or multiple processor cores and the memory 809 may represent multiple memories 809 that operate in parallel processing circuits, respectively. In such a case, the local interface 812 may be an appropriate network that facilitates communication between any two of the multiple processors 806, between any processor 806 and any of the memories 809, or between any two of the memories 809, etc. The local interface 812 may comprise additional systems designed to coordinate this communication, including, for example, performing load balancing. The processor 806 may be of electrical or of some other available construction.

Although the sensor evaluation application 118, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 6 and 7 show the functionality and operation of an implementation of portions of the sensor evaluation application 118. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 806 in a computer system or other system. The machine code may be converted from the source code, etc. If embodied in hardware, each block may represent a circuit or a number of interconnected circuits to implement the specified logical function(s).

Although the flowcharts of FIGS. 6 and 7 show a specific order of execution, it is understood that the order of execution may differ from that which is depicted. For example, the order of execution of two or more blocks may be scrambled relative to the order shown. Also, two or more blocks shown in succession in FIGS. 6 and 7 may be executed concurrently or with partial concurrence. Further, in some embodiments, one or more of the blocks shown in FIGS. 6 and 7 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the sensor evaluation application 118, that comprises software or code can be embodied in any non-transitory computer-readable medium for use by or in connection with an instruction execution system such as, for example, a processor 806 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the sensor evaluation application 118, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 803, or in multiple computing devices 803 in the same computing environment 115.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
an image capturing device;
a reference board comprising a plurality of reference structures for evaluating one or more performance metrics of the image capturing device;
at least one computing device in data communication with the image capturing device; and
at least one application executable in the at least one computing device, wherein when executed the at least one application causes the at least one computing device to at least:
cause the image capturing device to capture image data associated with the reference board, the image capture data comprising point cloud data associated with the reference board and one or more surrounding objects captured by the image capturing device;
cluster the point cloud data into a plurality of point cloud clusters;
identifying a particular point cloud cluster from the plurality of point cloud clusters corresponding to the reference board based at least in part on an analysis of the plurality of point cloud clusters and predefined ground truth data;

compare the particular point cloud cluster with the predefined ground truth data;
determine the one or more performance metrics based at least in part on the comparison of the particular point cloud cluster with the predefined ground truth data; and
generate a report indicating the one or more performance metrics of the image capturing device.

2. The system of claim 1, wherein the plurality of reference structures differ from one another in at least one of a shape, a size, an angle, a pattern, or a material.

3. The system of claim 1, wherein the one or more performance metrics comprise at least one of an overall accuracy metric, a depth precision metric, a curvature accuracy metric, a coverage metric, or a data acquisition time metric.

4. The system of claim 1, further comprising a robotic arm in data communication with the at least one computing device, the reference board being attached to an end effector of the robotic arm, the robotic arm being configured to reposition the reference board in a plurality of positions about one or more axes, and the image data corresponding to a plurality of representations of the reference board associated with the plurality of positions.

5. A method, comprising:
obtaining, by at least one computing device, image capture data from a depth sensor, the image capture data comprising a representation of a reference board captured by the depth sensor;
determining, by the at least one computing device, one or more performance metrics associated with the depth sensor by comparing the image capture data with predefined ground truth data associated with the reference board; and
generating, by the at least one computing device, a user interface comprising the one or more performance metrics associated with an image capturing device,
wherein the reference board comprises a plurality of alignment structures distributed along one or more edges of the reference board, and further comprising aligning the image capture data with ground truth data based at least in part on an identification of the plurality of alignment structures in the image capture data.

6. The method of claim 5, wherein the reference board comprises a plurality of reference structures comprising at least one of: a plurality of materials or a plurality of three-dimensional shapes differing from one another in at least one of a shape type, a size, an angle, or a pattern.

7. The method of claim 6, wherein the plurality of reference structures comprise the plurality of materials, and the plurality of materials differ from one another based at least in part on at least one of a material type, a color, a level of transparency, or a refractive index.

8. The method of claim 5, wherein the one or more performance metrics comprise at least one of an overall accuracy metric, a depth precision metric, a curvature accuracy metric, a coverage metric, or a data acquisition time metric.

9. The method of claim 5, wherein the reference board is coupled to a robotic arm configured to reposition the reference board at a plurality of angles about one or more axes.

10. The method of claim 9, further comprising:
causing the robotic arm to reposition the reference board to a given position;
determining that the reference board is at the given position; and
causing the image capturing device to capture an image of the reference board at the given position.

11. The method of claim 9, wherein the image capture data corresponds to a plurality of images of the reference board, individual images of the plurality of images corresponding to a respective position of a plurality of positions.

12. The method of claim 5, wherein the image capture data comprises point cloud data associated with the reference board and one or more surrounding objects captured by the depth sensor, and further comprising:
clustering the point cloud data into a plurality of point cloud clusters; and
identifying a particular point cloud cluster from the plurality of point cloud clusters corresponding to the reference board based at least in part on an analysis of the plurality of point cloud clusters and the predefined ground truth data, and the one or more performance metrics being identified by comparing the particular point cloud cluster with the predefined ground truth data.

13. The method of claim 5, further comprising transmitting the user interface to a client device.

14. A system, comprising:
at least one computing device; and
at least one application executable in the at least one computing device, wherein when executed the at least one application causes the at least one computing device to at least:
obtain image capture data from a depth sensor, the image capture data comprising a representation of a reference board comprising a plurality of reference structures for evaluating a performance metric of the depth sensor;
compare the image capture data with predefined ground truth data associated with the reference board to identify the performance metric associated with the depth sensor; and
generate a user interface identifying the performance metric and including a visual representation of the image capture data,
wherein the reference board comprises a material board, individual reference structures of the plurality of reference structures corresponding to a respective material of a plurality of materials, individual materials of the plurality of materials differing from one another based at least in part on at least one of a material type, a color, a level of transparency, or a refractive index.

15. The system of claim 14, wherein the reference board comprises a shape board, and the plurality of reference structures comprise a plurality of shapes varying in at least one of a type of shape, a dimension, a pattern, or an angle.

16. The system of claim 14, further comprising a robotic arm in data communication with the at least one computing device, the reference board being coupled to the robotic arm, and the robotic arm being configured to rotate the reference board into a plurality of positions about one or more axes.

17. The system of claim 16, wherein the representation of the reference board comprises a first representation of the reference board at a first position, and when executed, the at least one application causes the at least one computing device to at least:
direct the robotic arm to rotate the reference board to a second position; and
direct the depth sensor to capture a second representation of the reference board at the second position, the image capture data comprising data corresponding to the first position and the second position of the reference board.

18. The system of claim 14, wherein the performance metric comprises at least one of an overall accuracy metric, a depth precision metric, a curvature accuracy metric, a coverage metric, or a data acquisition time metric.

19. The system of claim 14, wherein the image capture data comprises point cloud data associated with the reference board and one or more surrounding objects captured by the depth sensor, and, when executed, the at least one application further causes the at least one computing device to at least:

cluster the point cloud data into a plurality of point cloud clusters; and identify a particular point cloud cluster from the plurality of point cloud clusters corresponding to the reference board based at least in part on an analysis of the plurality of point cloud clusters and the predefined ground truth data, and the performance metric being identified by comparing the particular point cloud cluster with the predefined ground truth data.

20. The system of claim 1, wherein the reference board comprises a material board, individual reference structures of the plurality of reference structures corresponding to a respective material of a plurality of materials, individual materials of the plurality of materials differing from one another based at least in part on at least one of a material type, a color, a level of transparency, or a refractive index.

* * * * *